US012658530B2

(12) United States Patent
Sakurai et al.

(10) Patent No.: US 12,658,530 B2
(45) Date of Patent: Jun. 16, 2026

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Hiroshi Sakurai, Osaka (JP); Tokimitsu Kobayashi, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 622 days.

(21) Appl. No.: 17/928,180

(22) PCT Filed: May 27, 2021

(86) PCT No.: PCT/JP2021/020206
§ 371 (c)(1),
(2) Date: Nov. 28, 2022

(87) PCT Pub. No.: WO2021/241690
PCT Pub. Date: Dec. 2, 2021

(65) Prior Publication Data
US 2023/0207970 A1 Jun. 29, 2023

(30) Foreign Application Priority Data
May 29, 2020 (JP) ................................. 2020-094855

(51) Int. Cl.
*H01M 50/489* (2021.01)
*H01M 50/423* (2021.01)
*H01M 50/446* (2021.01)
*H01M 50/449* (2021.01)

(52) U.S. Cl.
CPC ....... *H01M 50/489* (2021.01); *H01M 50/423* (2021.01); *H01M 50/446* (2021.01); *H01M 50/449* (2021.01)

(58) Field of Classification Search
CPC ............. H01M 50/489; H01M 50/423; H01M 50/446; H01M 50/449; H01M 50/403; H01M 10/0525; H01M 50/414; H01M 50/431; H01M 50/491; H01M 50/443; H01M 50/451; H01M 50/434; H01M 10/052; Y02E 60/10
See application file for complete search history.

(56) References Cited

U.S. PATENT DOCUMENTS

| | | | |
|---|---|---|---|
| 2010/0068612 A1 | 3/2010 | Nishikawa | |
| 2011/0165450 A1 | 7/2011 | Nishikawa | |
| 2011/0165469 A1 | 7/2011 | Nishikawa | |
| 2013/0273408 A1* | 10/2013 | Yoshitomi | H01M 50/417 |
| | | | 429/144 |
| 2014/0045033 A1 | 2/2014 | Zhang et al. | |
| 2015/0263325 A1* | 9/2015 | Honda | H01M 50/451 |
| | | | 429/144 |
| 2018/0111158 A1* | 4/2018 | Tanikawa | F26B 13/08 |
| 2020/0176744 A1 | 6/2020 | Zhang et al. | |

FOREIGN PATENT DOCUMENTS

| | | |
|---|---|---|
| CN | 101558513 A | 10/2009 |
| CN | 103262298 A | 8/2013 |
| CN | 104838519 A | 8/2015 |
| CN | 107405580 A | 11/2017 |
| JP | 2011-124177 A | 6/2011 |
| JP | 2016-139490 A | 8/2016 |
| JP | 2020-38835 A | 3/2020 |
| KR | 10-2015-0091471 A | 8/2015 |
| KR | 10-2017-0131401 A | 11/2017 |
| WO | 2008/062727 A1 | 5/2008 |
| WO | 2012/081556 A1 | 6/2012 |
| WO | 2016/157635 A1 | 10/2016 |

OTHER PUBLICATIONS

International Search Report for PCT/JP2021/020206 dated Aug. 17, 2021 (PCT/ISA/210).
"A Basic Guide to Particle Characterization", Malvern Instruments Worldwide—White Paper, May 2, 2012, XP055089322, pp. 1-26 (26 pages total).

* cited by examiner

*Primary Examiner* — Daniel S Gatewood
(74) *Attorney, Agent, or Firm* — Sughrue Mion, PLLC

(57) ABSTRACT

Provided is a separator for a non-aqueous secondary battery containing a porous substrate; and a porous layer that is provided on one side of the porous substrate, and that contains a resin and a filler, in which a shrinkage ratio in a MD direction, when heat-treated at 100° C. for 30 minutes under no tension, is more than 1.2% and less than or equal to 3.5%.

12 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2021/020206 filed May 27, 2021, claiming priority based on Japanese Patent Application No. 2020-094855 filed May 29, 2020.

TECHNICAL FIELD

The disclosure relates to a separator for a non-aqueous secondary battery and a non-aqueous secondary battery.

BACKGROUND ART

Non-aqueous secondary batteries represented by lithium ion secondary batteries are widely used as power sources for portable electronic devices such as notebook-size personal computers, mobile phones, digital cameras and camcorders. As a separator included in the non-aqueous secondary battery, a separator in which a layer containing a resin such as polyamide is applied to a substrate such as a polyethylene film, a separator in which nylon is kneaded into a polyethylene film, and the like are conventionally known.

For example, International Patent Application Laid-Open (WO-A) No. 2008/062727 describes a separator for a non-aqueous secondary battery including a porous layer containing a resin such as polyamide on one side or both sides of a microporous film mainly containing polyethylene.

SUMMARY OF INVENTION

Technical Problem

A separator is applied to a battery including an electrode wound body in which the separator is layered and wound between a positive electrode plate and a negative electrode plate. For example, an electrode wound body included in a wound type lithium ion secondary battery such as a cylindrical type or a square type is manufactured by inserting an end of a separator into a slit formed in a metal shaft core and winding the separator, then superposing and winding a positive electrode plate and a negative electrode plate with the separator interposed therebetween, and then removing the shaft core. At this time, in a case in which the shaft core has a poor shaft core releasing property (hereinafter, also referred to as "core releasing property"), when the shaft core is pulled out, the separator in contact with the shaft core is dragged by the shaft core, and a phenomenon occurs in which an inner peripheral portion of the electrode wound body protrudes in a bamboo shoot shape (that is, a spiral shape in which the diameter of a rotating surface decreases toward a moving destination) to lose the shape of the electrode wound body. In a case in which such a phenomenon occurs, not only a manufacturing efficiency of the electrode wound body may decrease, but also a problem such as loss of an insulating structure between the positive and negative electrodes of the electrode wound body may occur.

The disclosure has been made in view of the above circumstances.

A problem to be solved by an embodiment of the disclosure is to provide a separator for a non-aqueous secondary battery having a favorable core releasing property.

A problem to be solved by another embodiment of the disclosure is to provide a non-aqueous secondary battery having a high productivity.

Solution to Problem

The specific solutions to the problem include the following embodiments:

[1] A separator for a non-aqueous secondary battery, the separator comprising:

a porous substrate; and a porous layer that is provided on one side of the porous substrate and that contains a resin and a filler, wherein a shrinkage ratio in a MD direction of the separator for a non-aqueous secondary battery, when heat-treated at 100° C. for 30 minutes under no tension, is more than 1.2% and less than or equal to 3.5%.

[2] The separator for a non-aqueous secondary battery according to [1], wherein a shrinkage ratio in a MD direction of the separator for a non-aqueous secondary battery, when heat-treated at 150° C. for 30 minutes under no tension, is 15% or less, and wherein a shrinkage ratio in a TD direction of the separator for a non-aqueous secondary battery, when heat-treated at 150° C. for 30 minutes under no tension, is 15% or less.

[3] The separator for a non-aqueous secondary battery according to [1] or [2], wherein the resin is a meta-type wholly aromatic polyamide.

[4] The separator for a non-aqueous secondary battery according to any one of [1] to [3], wherein the filler contains at least one selected from the group consisting of a metal oxide, a metal hydroxide, a metal nitrate and a metal salt.

[5] The separator for a non-aqueous secondary battery according to any one of [1] to [4], wherein an average primary particle size of the filler is from 0.01 μm to 0.30 μm.

[6] The separator for a non-aqueous secondary battery according to any one of [1] to [5], wherein a piercing strength of the separator for a non-aqueous secondary battery is higher than a piercing strength of the porous substrate.

[7] A non-aqueous secondary battery that obtains electromotive force by lithium doping and dedoping, the non-aqueous secondary battery comprising:

a positive electrode;

a negative electrode; and the separator for a non-aqueous secondary battery according to any one of [1] to [6], the separator being disposed between the positive electrode and the negative electrode.

Advantageous Effects of Invention

According to an embodiment of the disclosure, there is provided a separator for a non-aqueous secondary battery having a favorable core releasing property.

According to another embodiment of the disclosure, a non-aqueous secondary battery having a high productivity is provided.

DESCRIPTION OF EMBODIMENTS

Hereinafter, embodiments of the disclosure will be described in detail. Note that the disclosure is not limited to the following embodiments at all, and can be implemented with appropriate modifications within the scope of the object of the disclosure.

In the disclosure, the numerical range denoted by using "to" represents the range inclusive of the number written before and after "to" as the minimum and maximum values. Regarding stepwise numerical ranges designated in the disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the present application, in a case where plural kinds of substances that correspond to the same component exist in a composition, the amount of the component in the composition refers to the total amount of the plural kinds of substances existing in the composition unless otherwise specified.

In the disclosure, "% by mass" and "% by weight" have the same meaning, and "parts by mass" and "parts by weight" have the same meaning.

In the disclosure, the term "process" includes not only an independent process, but also the process which is not clearly distinguished from other processes but achieves the desired purpose thereof.

In the disclosure, a combination of two or more preferred aspects is a more preferred aspect.

In the disclosure, the term "solid content" means a component excluding a solvent, and a liquid component other than the solvent, such as a low molecular weight component, is also included in the "solid content" in the disclosure.

In the disclosure, the term "solvent" is used to mean to include water, an organic solvent, and a mixed solvent of water and an organic solvent.

In the disclosure, "MD direction" refers to the longitudinal direction (that is, a conveying direction) of a porous substrate and a separator manufactured in a long shape, and "MD direction" also refers to "a machine direction". Further, in the disclosure, "TD direction" refers to a direction orthogonal to "MD direction", and "TD direction" also refers to "a transverse direction".

In the disclosure, a heat resistant resin refers to a resin having a melting point of 200° C. or higher, or a resin having no melting point and having a decomposition temperature of 200° C. or higher. That is, the heat resistant resin in the disclosure is a resin that is not melted or decomposed in a temperature range of lower than 200° C.

In the disclosure, "melting point" is a value measured using a differential scanning calorimeter (DSC). As the differential scanning calorimeter, for example, Q-200 manufactured by TA Instruments can be suitably used. Note that the differential scanning calorimeter is not limited thereto.

[Separator for Non-Aqueous Secondary Battery]

A separator for a non-aqueous secondary battery (hereinafter, also simply referred to as "separator") of the disclosure includes: a porous substrate; and a porous layer that is provided on one side of the porous substrate and that contains a resin and a filler, in which a shrinkage ratio in a MD direction of the separator for a non-aqueous secondary battery, when heat-treated at 100° C. for 30 minutes under no tension, is more than 1.2% and less than or equal to 3.5%.

The separator of the disclosure has a favorable core releasing property.

A reason why the separator of the disclosure can exhibit such an effect is not clear, but the present inventors presume the reason as follows. Note that the following presumption is not intended to limit the separator of the disclosure, and will be described as an example.

The separator is applied to a battery including an electrode wound body in which the separator is layered and wound between a positive electrode plate and a negative electrode plate. For example, a wound type lithium ion secondary battery such as a cylindrical type or a square type includes the electrode wound body. However, in manufacturing the electrode wound body, when a shaft core is pulled out, the separator in contact with the shaft core may be dragged by the shaft core, and a phenomenon may occur in which an inner peripheral portion of the electrode wound body protrudes in a bamboo shoot shape (that is, a spiral shape in which the diameter of a rotating surface decreases toward a moving destination) to lose the shape of the electrode wound body. For example, a conventional separator using a resin having a polar group in a molecule such as polyamide or nylon has characteristics of being easily charged with static electricity and being poor in slidability, and particularly easily causes the above-described phenomenon due to these characteristics.

On the other hand, in the separator of the disclosure, the porous layer containing the resin is provided only on one side of the porous substrate, and the separator can be wound with the porous substrate side facing the shaft core side such that the porous layer containing the resin does not come into contact with the shaft core. Therefore, the separator of the disclosure is hardly affected by the characteristics of the resin, and suppresses the phenomenon caused by the resin.

In addition, it is considered that the separator of the disclosure has a moderately high shrinkage ratio in the MD direction, and stress is accumulated in the separator to some extent. In a case in which stress is accumulated in the separator, the separator is stretched when the separator is wound around the shaft core. Therefore, winding of the separator tends to be uniform, and resistance when the shaft core is pulled out is reduced.

From the above, it is presumed that the separator of the disclosure has a favorable core releasing property.

Hereinafter, the separator for a non-aqueous secondary battery of the disclosure is also simply referred to as "separator".

~Shrinkage Ratio of Separator~

The separator of the disclosure has a shrinkage ratio in a MD direction of the separator for a non-aqueous secondary battery, when heat-treated at 100° C. for 30 minutes under no tension, is more than 1.2% and less than or equal to 3.5%

In a case in which the shrinkage ratio in the MD direction when the separator is heat-treated at 100° C. for 30 minutes is more than 1.2%, the core releasing property of the separator is favorable. When the shrinkage ratio of the separator is too high, stress accumulated in the separator is excessively large, and the separator tends to largely shrink when heated at a high temperature (for example, 150° C.). Since the separator of the disclosure has a shrinkage ratio in the MD direction of less than or equal to 3.5% when heat-treated at 100° C. for 30 minutes, the separator tends to have excellent heat resistance.

The separator of the disclosure has a shrinkage ratio in the MD direction of preferably 1.3% or more, more preferably 1.4% or more, still more preferably 1.5% or more when heat-treated at 100° C. for 30 minutes under no tension from a viewpoint of the core releasing property.

The separator of the disclosure has a shrinkage ratio in the MD direction of preferably 3.4% or less, more preferably 3.3% or less, still more preferably 3.2% or less when heat-treated at 100° C. for 30 minutes under no tension from a viewpoint of heat resistance.

The shrinkage ratio in the MD direction of the separator when the separator is heat-treated at 100° C. for 30 minutes is determined by the following method.

The separator is cut out into a size of 33 cm (MD direction)×6 cm (TD direction) to obtain a test body X. Next, marks are placed at positions of 2 cm and 32 cm (points a and b) from the top on a line that divides the TD direction of the test body X into two equal parts. Next, a clip is attached to the test body X. The clip is attached to a position within 2 cm from the top of the test body X in the MD direction. Next, the test body X with the clip is suspended in an oven adjusted to 100° C. and heat-treated for 30 minutes under no tension. A length between a and b is measured before and after the heat treatment, and a shrinkage ratio (%) in the MD direction is determined according to the following Formula X1.

$$\text{Shrinkage ratio in MD direction}=\{(\text{length between a}$$
$$\text{and b before heat treatment}-\text{length between a}$$
$$\text{and b after heat treatment})/\text{length between a}$$
$$\text{and b before heat treatment}\}\times100 \qquad \text{(Formula X1)}$$

The shrinkage ratio of the separator of the disclosure can be controlled by a manufacturing method. The shrinkage ratio of the separator of the disclosure can be controlled, for example, by accumulating stress inside the separator by performing thermal stretching, slit processing, or the like in a process of manufacturing the separator. A specific control method will be described in the section of Method of Manufacturing Separator.

The separator of the disclosure preferably has a shrinkage ratio in the MD direction of 15% or less and a shrinkage ratio in the TD direction of 15% or less when heat-treated at 150° C. for 30 minutes under no tension from a viewpoint of heat resistance.

In the disclosure, the shrinkage ratio (shrinkage ratio in the MD direction and shrinkage ratio in the TD direction) when the separator is heat-treated at 150° C. for 30 minutes is also referred to as "thermal shrinkage ratio".

The separator of the disclosure has a shrinkage ratio in the MD direction of preferably 12% or less, more preferably 10% or less, still more preferably 9% or less, particularly preferably 8% or less when heat-treated at 150° C. for 30 minutes under no tension. The separator of the disclosure has a shrinkage ratio in the TD direction of preferably 12% or less, more preferably 10% or less when heat-treated at 150° C. for 30 minutes under no tension.

The thermal shrinkage ratio of the separator when the separator is heat-treated at 150° C. for 30 minutes is determined by the following method.

The separator is cut out into a size of 18 cm (MD direction)×6 cm (TD direction) to obtain a test body Y. Next, marks are placed at positions of 2 cm and 17 cm (points A and B) from the top on a line that divides the TD direction of the test body Y into two equal parts. In addition, marks are placed at positions of 1 cm and 5 cm (points C and D) from the left on a line that divides the MD direction of the test body Y into two equal parts. Next, a clip is attached to the test body Y. The clip is attached to a position within 2 cm from the top of the test body Y in the MD direction. Next, the test body Y with the clip is suspended in an oven adjusted to 150° C. and heat-treated for 30 minutes under no tension. Note that, in a case in which the test body Y may adhere in a surface of the porous substrate due to intense movement of the test body Y due to hot air, release paper may be suspended in the oven in a form of sandwiching the test body Y so as not to come into contact with the test body Y to perform the heat treatment. A length between A and B and a length between C and D are measured before and after the heat treatment, and thermal shrinkage ratios (%) are determined according to the following Formulas Y1 and Y2.

$$\text{Thermal shrinkage ratio in MD direction}=\{(\text{length}$$
$$\text{between A and B before heat treatment}-\text{length}$$
$$\text{between A and B after heat treatment})/\text{length}$$
$$\text{between A and B before heat treatment}\}\times100 \qquad \text{(Formula Y1)}$$

$$\text{Thermal shrinkage ratio in TD direction}=\{(\text{length}$$
$$\text{between C and D before heat treatment}-\text{length}$$
$$\text{between C and D after heat treatment})/\text{length}$$
$$\text{between C and D before heat treatment}\}\times100 \qquad \text{(Formula Y2)}$$

The separator of the disclosure may further include a layer other than the porous substrate and the porous layer (so-called another layer). Examples of the other layer include an adhesive layer provided as an outermost layer mainly for the purpose of bonding to an electrode.

<Porous Substrate>

The separator of the disclosure comprises a porous substrate.

The porous substrate in the disclosure has plural micropores therein in which these micropores are connected to each other, and allowing gas or liquid to pass from one surface of the porous substrate to the other surface. As the substrate, a microporous film; a porous sheet composed of a fibrous material (such as non-woven fabric and paper); and the like may be listed.

In the porous substrate of the disclosure, a microporous film is preferable from the viewpoint of thinning and strength of a separator. The microporous film refers to a porous substrate having plural micropores therein.

As the material for the porous substrate, materials having electrical insulation are preferably used and any of organic materials and inorganic materials may be used.

It is preferred that the porous substrate contains a thermoplastic resin, from the viewpoint of imparting a shutdown function to the porous substrate. The shutdown function refers to a function of dissolving the constituent material to clog the pores of the porous substrate, thereby blocking ionic migration, and preventing thermal runaway of a battery, when the battery temperature is raised. As the thermoplastic resin, a thermoplastic resin having a melting point less than 200° C. is preferred.

As the thermoplastic resin, for example, polyesters such as polyethylene terephthalate; polyolefins such as polyethylene and polypropylene; and the like may be mentioned. Among them, as the thermoplastic resin, polyolefins are preferred.

As the porous substrate, a microporous film containing polyolefin (also referred to as "polyolefin microporous film") is preferred. As the polyolefin microporous film, for example, a polyolefin microporous film which is applied to the conventional separator for a battery may be mentioned, and among them, it is preferred to select those having sufficient mechanical properties and ion permeability.

It is preferred that the polyolefin microporous film contains polyethylene, from the viewpoint of exhibiting the shutdown function. In the case that the polyolefin microporous film contains polyethylene, the content of polyethylene is preferably 95% by mass or more with respect to the total mass of the polyolefin microporous film.

It is preferred that the polyolefin microporous film contains polypropylene, from the viewpoint of imparting heat resistance, in particular, a property that the film is not easily broken when exposed to a high temperature.

It is preferred that the polyolefin microporous film contains polyethylene and polypropylene, from the viewpoint of imparting shutdown function and the property that the film is not easily broken when exposed to a high temperature (that is, heat resistance). As the polyolefin microporous film, a microporous film in which polyethylene and polypropylene are present in a mixed state in a layer, a polyolefin microporous film having a lamination structure with two or more layers, in which at least one layer contains polyethylene and at least one layer contains polypropylene, may be mentioned.

In the case that the polyolefin microporous film contains polyethylene and polypropylene, it is preferred that the polyolefin microporous film contains 95% by mass or more of polyethylene and 5% by mass or less of polypropylene, from the viewpoint of good balance of the shutdown function and heat resistance.

The weight-average molecular weight (Mw) of the polyolefin contained in the polyolefin microporous film is not particularly limited and preferably from 100,000 to 5,000,000. In the case that the polyolefin has a Mw of 100,000 or more, better mechanical properties may be provided to the microporous film. Meanwhile, the polyolefin has a Mw of 5,000,000 or less, the shutdown characteristic of the microporous film is better, and film molding of the microporous film is easy.

A weight average molecular weight (Mw) of the polyolefin is a value measured by gel permeation chromatography (GPC).

Specifically, a sample (polyolefin microporous membrane or polyolefin) is heated and dissolved in o-dichlorobenzene to prepare a sample solution. As a measurement apparatus, GPC (Alliance GPC 2000 type manufactured by Waters Corporation) is used with a column of GMH6-HT and GMH6-HTL. Measurement is performed under the conditions of a column temperature of 135° C. and a flow rate of 1.0 mL/min, and the Mw is obtained as a polystyrene equivalent molecular weight.

Examples of the method for manufacturing the polyolefin microporous film include, a method containing extruding a molten polyolefin resin from a T-die to form a sheet, crystallizing and elongating the sheet, and further subjecting the sheet to heat treatment, thereby obtaining a microporous film; and a method containing extruding a polyolefin resin melted with a plasticizer such as liquid paraffin from a T-die, cooling it to form a sheet, elongating the sheet, extracting the plasticizer, and performing heat treatment, thereby obtaining a microporous film.

As the porous sheet composed of a fibrous material, a porous sheet composed of a fibrous material (for example, non-woven fabric and paper) such as polyesters such as polyethylene terephthalate; polyolefins such as polyethylene and polypropylene; heat-resistant resins such as wholly aromatic polyamide, polyamide-imide, polyimide, polyethersulfone, polysulfone, polyetherketone and polyetherimide; cellulose; and the like may be mentioned.

The side of the porous substrate may be subjected to various side treatments within the range of not impairing the nature of the porous substrate. In the case that the side of the porous substrate is subjected to the side treatment, wettability with the coating liquid for forming the heat resistant porous layer, which will be described later, may be improved. As the side treatment, corona treatment, plasma treatment, flame treatment, UV irradiation treatment, and the like may be mentioned.

[Characteristics of Porous Substrate]

<<Thickness>>

The thickness of the porous substrate is preferably 15 µm or less, more preferably 13 µm or less, from the viewpoint of enhancing energy density of the battery, and is preferably 4 µm or more, more preferably 6 µm or more, from the viewpoint of production yield of the separator and production yield of the battery.

The thicknesses (µm) of the porous substrate is a value measured with a cylindrical measurement terminal having a diameter of 5 mm using a contact type thickness meter (LITEMATIC, manufactured by Mitutoyo Corporation). Adjustment is performed during the measurement such that a load of 7 g is applied, any 20 points within a size of 10 cm×10 cm are measured, and an average value thereof is calculated.

<<Gurley Value>>

The Gurley value of the porous substrate (JIS P8117: 2009) is preferably from 50 sec/100 mL to 400 sec/100 mL from the viewpoint of ion permeability or suppression of battery short circuit.

The Gurley value (sec/100 mL) of the porous substrate is a value measured according to JIS P8117: 2009. A Gurley type densometer (Toyo Seiki Seisaku-sho, Ltd., G-B2C) is preferably used for the measurement.

<<Porosity>>

The porous substrate preferably has a porosity of from 20% to 60% from the viewpoint of obtaining an appropriate film resistance and a shutdown function. The porosity of the porous substrate is determined by the following formula.

$$\varepsilon = \{1 - Ws/(ds \cdot)\} \times 100$$

In the formula, ε, Ws, ds and t represent as follows.

ε: porosity of porous substrate (%)

Ws: basis weight of porous substrate (g/m$^2$)

ds: true density of porous substrate (g/cm$^3$)

t: thickness (cm) of porous substrate

<<Average Pore Size>>

The porous substrate preferably has an average pore size of from 20 nm to 100 nm, more preferably from 30 nm to 90 nm, and still more preferably from 40 nm to 80 nm from the viewpoint of ion permeability and suppression of battery short circuit.

The average pore size of the porous substrate is measured using a palm porometer according to ASTM E1294-89. As the palm porometer, for example, CFP-1500-A, manufactured by Porous Materials INC. (PMI) may be appropriately used.

<<Piercing Strength>>

The piercing strength of the porous substrate is preferably 200 g or more from the viewpoint of production yield of the separator and production yield of the battery.

The piercing strength of the porous substrate is measured by performing a piercing test under the conditions of a curvature radius of a needle tip of 0.5 mm, and a piercing speed of 2 mm/sec, using a KES-G5 handy compression tester manufactured by KATO TECH CO., LTD., to obtain a maximum piercing load (g).

<Porous Layer>

The separator of the disclosure contains a porous layer that includes a resin and a filler. The porous layer is a layer having a large number of micropores and allowing gas or liquid to pass therethrough from one side to the other side.

In the separator of the disclosure, the porous layer is provided only on one side of the porous substrate. In a case in which the porous layer is provided only on one side of the porous substrate, the separator can be wound with the porous substrate side facing the shaft core side such that the porous layer does not come into contact with the shaft core. For this reason, even in a case in which the resin contained in the porous layer is, for example, a resin (for example, polyamide) having characteristics of being easily charged with static electricity and being poor in slidability due to having a polar group in a molecule thereof or the like, the resin can be used without impairing the core releasing property, and a range of selection of the resin is widened.

Further in a case in which the porous layer is provided only on one side of the porous substrate, the separator has better ion permeability. In addition, the thickness of the entire separator can be suppressed, and a battery having a higher energy density can be produced.

(Resin)

The porous layer contains a resin.

In the porous layer, the resin serves as a binder.

The kind of the resin is not particularly limited as long as being able to bond the filler which is described later.

The resin is preferably a heat resistant resin. The resin is preferably a resin that is stable to an electrolytic solution and is also electrochemically stable. The porous layer may contain the resin singly or in combination of two or more kinds thereof.

The resin preferably has adhesiveness to an electrode of a battery, and the kind of the resin may be selected according to the composition of a positive electrode or a negative electrode.

As the resin, a polymer having a polar functional group or atomic group.

Examples of the polar functional group or atomic group include a hydroxy group, a carboxy group, an amino group, an amide group, and a carbonyl group.

Specific examples of the resin include a polyvinylidene fluoride type resin, a wholly aromatic polyamide, a poly-amideimide, a polyimide, a polyether sulfone, a polysulfone, a polyether ketone, a polyketone, a polyether imide, a poly-N-vinylacetamide, a polyacrylamide, a copolymerized polyether polyamide, a fluorine type rubber, an acrylic type resin, a styrene-butadiene copolymer, a cellulose, and a polyvinyl alcohol.

The resin may be a particulate resin.

Examples of the particulate resin include resin particles of a polyvinylidene fluoride type resin, a fluorine type rubber, and a styrene-butadiene copolymer. The resin may be a water-soluble resin such as a cellulose or a polyvinyl alcohol. When a particulate resin or a water-soluble resin is used as the resin, the resin is dispersed or dissolved in water to prepare a coating liquid, and the porous layer can be formed on a porous substrate using the coating liquid by a dry coating method.

The resin is preferably a polyvinylidene fluoride type resin (PVDF resin) from a viewpoint of adhesiveness to an electrode. By inclusion of the PVDF resin in the porous layer, the adhesiveness between the porous layer and an electrode is improved. As a result, the strength (cell strength) of a battery can be improved.

The PVDF resin is described, for example, in paragraphs [0056] to [0063] of WO-A No. 2019/146155. This description is incorporated herein by reference.

The resin is preferably at least one selected from the group consisting of a wholly aromatic polyamide, a polyamideimide, a poly-N-vinylacetamide, a polyacrylamide, a copolymerized polyether polyamide, a polyimide, and a polyether-imide, from the viewpoint of excellent heat resistance, and a wholly aromatic polyamide is more preferable. In particular, a wholly aromatic polyamide has a melting point of 200° C. or higher, and can therefore enhance heat resistance of a separator and improve safety of a secondary battery.

A wholly aromatic polyamide contains a meta-type wholly aromatic polyamide and para-type wholly aromatic polyamide. A meta-type or para-type wholly aromatic polyamide may be used. Among wholly aromatic polyamides, a meta-type wholly aromatic polyamide is preferable as the resin from viewpoints of easy formation of a porous layer due to good crystallinity and excellent oxidation-reduction resistance in an electrode reaction.

Examples of a meta-type wholly aromatic polyamide include polymetaphenylene isophthalamide or the like. Examples of a para-type wholly aromatic polyamide include copolyparaphenylene 3.4' oxydiphenylene terephthalamide, polyparaphenylene terephthalamide or the like.

As the wholly aromatic polyamide, a commercially available product on the market may be used.

Examples of the commercially available product include CONEX (registered trademark, meta-type), TECHNORA (registered trademark, para-type), and Twaron (registered trademark, para-type), all manufactured by TEIJIN CORPORATION.

The resin has a weight average molecular weight (Mw) of preferably 100,000 to 3,000,000, more preferably 100,000 to 2,000,000.

In a case in which the Mw of the resin is 100,000 or more, mechanical characteristics of the porous layer are more favorable. In a case in which the Mw of the resin is 3,000,000 or less, the viscosity of a coating liquid for forming the porous layer does not become excessively high, and moldability is more favorable.

The weight average molecular weight (Mw) of the resin contained in the porous layer is a value measured by gel permeation chromatography (GPC). As a measurement apparatus, a GPC device "GPC-900" manufactured by JASCO Corporation is used with two columns of TSKgel SUPER AWM-H manufactured by Tosoh Corporation, using dimethylformamide for a solvent. Measurement is performed under the conditions of a column temperature of 40° C. and a flow rate of 0.6 mL/min, and the Mw is obtained as a polystyrene equivalent molecular weight.

The content of the resin in the porous layer is preferably 10% by mass to 40% by mass, and more preferably 15% by mass to 35% by mass with respect to the total solid content of the porous layer.

(Filler)

The porous layer contains a filler.

The filler may be formed of an inorganic particle or an organic particle.

The filler is preferably formed of an inorganic particle from viewpoints of improving heat resistance, reducing film resistance, and reducing a friction coefficient.

The filler formed of an inorganic particle is preferably at least one selected from the group consisting of a metal oxide, a metal hydroxide, a metal nitride, and a metal salt.

Examples of the metal oxide include alumina, zirconia, yttria, ceria, magnesia, titania, and silica. Examples of the metal hydroxide include magnesium hydroxide. Examples of the metal nitride include boron nitride and aluminum nitride. Examples of the metal salt include calcium carbonate and barium sulfate.

The filler formed of an inorganic particle is preferably formed of a divalent metal-containing particle from viewpoints of improving heat resistance, reducing film resistance, and reducing a friction coefficient.

The divalent metal-containing particle is preferably a magnesium-containing particle or a barium-containing particle.

The magnesium-containing particle is preferably a particle of magnesium sulfate, magnesium hydroxide, magnesium oxide, or the like, and more preferably a particle of magnesium hydroxide.

The barium-containing particle is preferably a particle of barium sulfate.

The filler has an average primary particle size of preferably 0.01 μm to 0.3 μm, more preferably 0.03 μm to 0.3 μm, still more preferably 0.03 μm to 0.25 μm.

In a case in which the average primary particle size of the filler is 0.01 μm or more, the porous structure is more easily formed. In a case in which the average primary particle size of the filler is 0.3 μm or less, the heat resistance of the porous layer is further improved.

The average primary particle size of the filler is obtained by measuring major diameters of 100 fillers particles randomly selected in observation with a scanning electron microscope (SEM), and averaging the major diameters of 100 filler particles. The sample to be subjected to the observation of the SEM is a filler as a material of the porous layer or a filler taken out from the separator. The method of taking out the filler from the separator is not limited, and examples thereof include a method in which the separator is heated to about 800° C. to remove the resin and take out the filler, and a method in which the separator is immersed in an organic solvent to dissolve the resin with the organic solvent and take out the filler.

In a case in which the average primary particle size of the filler is small, or in a case in which aggregation of the filler is remarkable and a major axis of the filler cannot be measured, a specific surface area of the filler is measured by a BET method, and the average primary particle size is calculated from a specific gravity and a specific surface area of the filler according to the following formula by assuming that the filler is a true sphere.

$$\text{Average primary particle size } (\mu m) = 6 \div [\text{specific gravity } (g/cm^3) \times \text{BET specific surface area } (m^2/g)]$$

Note that, in the specific surface area measurement by the BET method, an inert gas is used as an adsorbent, and the inert gas is adsorbed on a filler surface at a boiling point (−196° C.) of liquid nitrogen. The amount of gas adsorbed on a sample is measured as a function of a pressure of the adsorbent, and a specific surface area of the sample is determined from the adsorption amount.

The shape of the filler is not particularly limited, and examples thereof include a spherical shape, a plate shape, a needle shape, and a fiber shape. Examples of "spherical shape" in the disclosure include not only a true spherical shape but also a substantially spherical shape.

A volume ratio of the filler in the porous layer is preferably 50% by volume to 90% by volume, more preferably 55% by volume to 85% by volume, and still more preferably 60% by volume to 80% by volume.

In a case in which the volume ratio of the filler in the porous layer is 50% by volume or more, the heat resistance of the porous layer is further improved. In a case in which the volume ratio of the filler in the porous layer is 90% by volume or less, the porous layer is more unlikely to be peeled off from the porous substrate.

A content ratio (volume ratio Va (%)) of the filler to the total solid content of the filler and other components containing the resin in the porous layer can be determined by the following formula.

$$Va = \{(Xa/Da)/(Xa/Da + Xb/db + Xc/Dc + \ldots + Xn/Dn)\} \times 100$$

12

Here, among the constituent materials of the heat-resistant porous layer, the filler is represented by a, and other constituent materials containing the resin are represented by b, c, . . . , and n, respectively, the masses of the constituent materials are represented by Xa, Xb, Xc, . . . , and Xn (g), respectively, and the true densities of the constituent materials are represented by Da, db, Dc, . . . , and Dn (g/cm³), respectively.

(Other Component)

The porous layer in the disclosure may contain a component other than the resin and the filler (so-called another component), if necessary. Examples of the other component include various additives.

Examples of the additive include a dispersant such as a surfactant, a wetting agent, an antifoaming agent, and a pH adjusting agent.

The porous layer can be formed by preparing a coating liquid for forming the porous layer and applying the coating liquid to the porous substrate.

~Properties of Porous Layer~

<<Thickness>>

The porous layer preferably has a thickness of 0.3 μm to 5.0 μm. In a case in which the thickness of the porous layer is 0.3 μm or more, the porous layer is a smooth and homogeneous layer, and cycle characteristics of a battery are further improved. The thickness of the porous layer is more preferably 1.5 μm or more from a similar viewpoint.

In a case in which the thickness of the porous layer is 5.0 μm or less, the porous layer has more favorable ion permeability, and a load characteristic of a battery is more favorable. The thickness of the porous layer is more preferably 4.5 μm or less from a similar viewpoint.

<<Porosity>>

The porosity of the porous layer is preferably 30% or more from the viewpoint of ion permeability of the separator, and is preferably 80% or less, more preferably 70% or less, still more preferably 60% or less, and further still more preferably 50% or less from the viewpoint of thermal dimensional stability of the separator.

The porosity ε (%) of the porous layer is determined by the following formula.

$$\varepsilon = \{1 - (Wa/da + Wb/db + Wc/dc + \ldots + Wn/dn)/t\} \times 100$$

Here, the constituent materials of the porous layer are represented by a, b, c, . . . , n, the mass per unit area of each constituent material is Wa, Wb, Wc, . . . , or Wn (g/cm²), the true density of each constituent material is represented by da, db, dc, . . . , or dn (g/cm³), and the thickness of the porous layer is represented by t (cm).

<<Average Pore Size>>

The average pore size of the porous layer is preferably from 10 nm to 200 nm. In a case where the average pore size of the porous layer is 10 nm or more, when the porous layer is impregnated with an electrolytic solution, the pores are hardly blocked even if a resin contained in the porous layer swells. In a case where the average pore size of the porous layer is 200 nm or less, uniformity in ion transfer is high, and a battery has excellent cycle characteristics and load characteristics.

The average pore size (nm) of the porous layer is calculated by the following formula, assuming that all pores are cylindrical.

$$d = 4V/S$$

In the formula, d represents an average pore size (diameter; nm) of the porous layer, V represents a pore volume per square meter of the porous layer, and S represents a pore surface area per square meter of the heat resistant porous layer.

The pore volume V per square meter of the porous layer is calculated from the porosity of the porous layer.

The pore surface area S per square meter of the porous layer is determined by the following method.

First, a specific surface area ($m^2/g$) of the porous substrate and a specific surface area ($m^2/g$) of the separator are calculated from a nitrogen gas adsorption amount by applying a BET formula to a nitrogen gas adsorption method. These specific surface areas ($m^2/g$) are multiplied by basis weights ($g/m^2$) of the porous substrate and the separator, respectively, to calculate a pore surface area per square meter. Then, the pore surface area per square meter of the porous substrate is subtracted from the pore surface area per square meter of the separator to calculate the pore surface area S per square meter of the porous layer.

Characteristics of Separator

<<Thickness>>

The thickness of the separator of the disclosure is preferably 5 μm or more, and more preferably 10 μm or more from the viewpoint of the mechanical strength of the separator, and is preferably 25 μm or less, and more preferably 20 μm or less from the viewpoint of the energy density of a battery.

The thickness of the separator is a value measured with a cylindrical measurement terminal having a diameter of 5 mm using a contact type thickness meter (LITEMATIC, manufactured by Mitutoyo Corporation). Adjustment is performed during the measurement such that a load of 7 g is applied, any 20 points within a size of 10 cm×10 cm are measured, and an average value thereof is calculated.

<<Piercing Strength>>

The piercing strength of the separator of the disclosure is preferably from 250 g to 1000 g, and more preferably from 300 g to 700 g from the viewpoint of the mechanical strength of the separator or the short-circuit resistance of a battery.

A method of measuring the piercing strength of the separator is similar to a method of measuring the piercing strength of the porous substrate.

The piercing strength of the separator of the disclosure is preferably higher than the above-described piercing strength of the porous substrate.

<<Porosity>>

The porosity of the separator of the disclosure is preferably from 30% to 60% from the viewpoint of adhesiveness to an electrode, the handleability of the separator, the ion permeability thereof, or the mechanical strength thereof.

The porosity ε (%) of the separator is determined by the following formula.

$$\varepsilon = \{1 - (Wa/da + Wb/db + Wc/dc + \ldots + Wn/dn)/t\} \times 100$$

Here, the constituent materials of the separator are represented by a, b, c, . . . , n, the mass per unit area of each constituent material is Wa, Wb, Wc, . . . , or Wn ($g/cm^2$), the true density of each constituent material is represented by da, db, dc, . . . , or dn ($g/cm^3$), and the thickness of the separator is represented by t (cm).

<<Gurley Value>>

The separator of the disclosure has a Gurley value (JIS P8117: 2009) of preferably from 50 sec/100 mL to 800 sec/100 mL, more preferably from 100 sec/100 mL to 400 sec/100 mL from the viewpoint of a balance between mechanical strength and ion permeability.

The Gurley value (sec/100 ml) of the separator is a value measured in accordance with JIS P8117 (2009). The Gurley type densometer (G-B2C manufactured by Toyo Seiki Sei-saku-sho, Ltd.) is preferably used as the measurement apparatus.

<<Film Resistance>>

The separator of the disclosure preferably has a film resistance of from 1 $\Omega \cdot cm^2$ to 10 $\Omega \cdot cm^2$ from the viewpoint of load characteristics of a battery. Here, the film resistance of the separator refers to a resistance value in a state where the separator is impregnated with an electrolytic solution, and is measured by an AC method at 20° C. using 1 mol/L $LiBF_4$— propylene carbonate:ethylene carbonate (mass ratio 1:1) as the electrolytic solution. The separator with a lower film resistance value has better ion permeability.

Method of Producing Separator

The separator of the disclosure can be produced, for example, by forming the porous layer on the porous substrate by a wet coating method or a dry coating method. In the disclosure, the wet coating method is a method of solidifying a coating layer in a coagulation liquid, and the dry coating method is a method of drying a coating layer to solidify the coating layer.

The separator of the disclosure may be produced, for example, by preparing a coating liquid in which a resin and a filler are dissolved or dispersed in an aprotic polar solvent, applying the coating liquid onto a porous substrate to form a coating film on one side of the porous substrate, and solidifying the coating film to form a porous layer onto the porous substrate.

Hereinafter, embodiment examples of the wet coating method (hereinafter, also referred to as "production method according to the embodiment") will be described.

The production method according to the embodiment preferably contains a process of preparing a coating liquid containing a resin and a filler dissolved or dispersed in an aprotic polar solvent.

The coating liquid for forming the porous layer is prepared by dissolving or dispersing a resin and a filler in a solvent. In the coating liquid, a component other than the resin and the filler (so-called another component) is dissolved or dispersed, if necessary.

A solvent used for preparing the coating liquid includes an aprotic polar solvent that dissolves the resin (hereinafter, also referred to as "good solvent"). Examples of the good solvent include a polar amide solvent such as N-methylpyr-rolidone, dimethylacetamide, dimethylformamide, or dim-ethylformamide.

The solvent used for preparing the coating liquid preferably contains a phase separation agent that induces phase separation from the viewpoint of forming a porous layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 50% by mass or more of the good solvent and 50% by mass or less of the phase separation agent from the viewpoint of forming a favorable porous structure.

The resin concentration of the coating liquid is preferably from 1% by mass to 20% by mass from the viewpoint of forming a favorable porous structure. The filler concentration of the coating liquid is preferably from 2% by mass to 50% by mass from the viewpoint of forming a favorable porous structure.

The production method according to the embodiment preferably contains a process of applying the coating liquid to the porous substrate so form a coating film on one side of the porous substrate.

Examples of a means of applying the coating liquid to the porous substrate include a Meyer bar, a die coater, a reverse roll coater, a roll coater, and a gravure coater.

The production method according to the embodiment preferably contains a process of solidifying the coating film to form a porous layer on the porous substrate.

The coating layer is preferably solidified by immersing the porous substrate on which the coating layer is formed in a coagulation liquid, and solidifying the resin while phase separation is induced in the coating layer. As a result, a layered body composed of the porous substrate and the solidified coating film is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure and productivity. The temperature of the coagulation liquid is, for example, from 20° C. to 50° C.

After the coating layer is solidified in the coagulation liquid, the layered body is pulled out of the coagulation liquid and washed with water. By washing the layered body with water, the coagulation liquid is removed from the layered body. Washing with water is performed, for example, by transporting the layered body in a water washing bath.

By drying the layered body, water is removed from the layered body. Drying is performed, for example, by transporting the layered body in a high-temperature environment, blowing air to the layered body, or bringing the layered body into contact with a heat roll. The drying temperature is preferably from 30° C. to 130° C.

The laminated body after being washed with water may be dried by thermal stretching. For example, the laminated body may be dried by being stretched in the MD direction while being heated (so-called thermal stretching). A stretch ratio is preferably 0.5% to 5%.

For example, by appropriately adjusting a stretch temperature and a stretch ratio in the thermal stretching, a shrinkage ratio of the separator in the MD direction when the separator is heat-treated at 100° C. for 30 minutes under no tension can be adjusted to a range of more than 1.2% and less than or equal to 3.5%.

In a case in which thermal stretching is performed, the shrinkage ratio tends to increase. In a case in which a stretch temperature is increased, the shrinkage ratio tends to increase. In a case in which a stretch ratio is increased, the shrinkage ratio tends to increase.

The dried laminated body is preferably subjected to slit processing. An unwinding tension in the slit processing is preferably 10 N/m to 250 N/m. A winding tension in the slit processing is preferably 0.005 N/mm to 0.5 N/mm.

The shrinkage ratio can be adjusted by appropriately adjusting the unwinding tension and the winding tension.

The separator of the disclosure can also be produced by a dry coating method. The dry coating method is a method of applying a coating liquid to a porous substrate, drying the coating layer to remove a solvent by evaporation, and thereby forming a heat resistant porous layer on the porous substrate.

Non-Aqueous Secondary Battery

A non-aqueous secondary battery of the disclosure is a non-aqueous secondary battery that obtains an electromotive force by doping/dedoping lithium, and includes a positive electrode, a negative electrode, and a separator for a non-aqueous secondary battery of the disclosure.

The separator for a non-aqueous secondary battery of the disclosure is excellent in manufacturing efficiency of an electrode wound body because of having a favorable core releasing property. Therefore, the non-aqueous secondary battery of the disclosure has a high productivity.

The doping means occlusion, support, adsorption, or insertion, and means a phenomenon that lithium ions enter an active material of an electrode such as a positive electrode.

The non-aqueous secondary battery of the disclosure has a structure in which, for example, a battery element in which a negative electrode and a positive electrode face each other with a separator interposed therebetween is enclosed in an exterior material together with an electrolytic solution. The non-aqueous secondary battery of the disclosure is suitable for a non-aqueous electrolyte secondary battery, particularly for a lithium ion secondary battery.

Hereinafter, aspect examples of the positive electrode, negative electrode, electrolyte solution, and exterior material included in the non-aqueous secondary battery according to the disclosure will be described.

Examples of an embodiment of the positive electrode include a structure in which an active material layer containing a positive electrode active material and a binder resin is formed on a current collector. The active material layer may further contain a conductive auxiliary agent.

Examples of the positive electrode active material include a lithium-containing transition metal oxide, and specific examples thereof include $LiCoO_2$, $LiNiO_2$, $LiMn_{1/2}Ni_{1/2}$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$. Examples of the binder resin include a polyvinylidene fluoride type resin, and a styrene-butadiene copolymer.

Examples of the conductive auxiliary agent include carbon materials such as acetylene black, Ketjen black, and graphite powder.

Examples of the current collector include an aluminum foil, a titanium foil, and a stainless steel foil, each having a thickness of from 5 μm to 20 μm.

Examples of an embodiment of the negative electrode include a structure in which an active material layer containing a negative electrode active material and a binder resin is formed on a current collector. The active material layer may further contain a conductive auxiliary agent.

Examples of the negative electrode active material include materials capable of electrochemically occluding lithium. Specific examples thereof include carbon materials; and alloys of lithium in combination with silicon, tin, aluminum; wood's alloy, or the like.

Examples of the binder resin include a polyvinylidene fluoride type resin and a styrene-butadiene copolymer.

Examples of the conductive auxiliary agent include carbon materials such as acetylene black, Ketjen black, and graphite powder.

Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. The lithium salt may be used singly or in combination of two or more kinds thereof. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination of two or more kinds thereof. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 mol/L to 1.5 mol/L.

Examples of the exterior material include a metal can and an aluminum laminated film pack. The shape of the battery may be a square shape, a cylindrical shape, a coin shape, and the like, but the separator of the disclosure is suitable for any one of these shapes.

EXAMPLES

Hereinafter, the separator and the non-aqueous secondary battery of the disclosure will be described more specifically with reference to Examples. Materials, used amounts, ratios, treatment procedures, and the like illustrated in the following Examples can be changed, if appropriate without departing from the spirit of the disclosure. Therefore, the range of the separator and the non-aqueous secondary battery of the disclosure should not be construed as being limited by the specific examples described below.

[Measurement Method and Evaluation Method]

The measurement methods and evaluation methods applied in the examples of the invention and comparative examples are as follows.

<Average Primary Particle Size of Filler>

The filler before being added to the coating liquid for forming the porous layer was used as a sample.

The average primary particle size of the filler was determined according to the following formula by measuring a specific gravity ($g/cm^3$) and a specific surface area ($m^2/g$), and assuming that the filler was a true sphere.

Average primary particle size (μm)=6÷[specific gravity ($g/cm^3$)×specific surface area ($m^2/g$)]

The specific surface area of the filler was measured by the BET method. As a measuring device, a specific surface area/pore distribution measuring device (ASAP 2020, Micromeritics) was used. Specifically, the measurement was performed according to the following procedure. An inert gas was used as an adsorbent, and the inert gas was adsorbed on a filler surface at a boiling point (−196° C.) of liquid nitrogen. Next, the amount of gas adsorbed on the sample was measured as a function of a pressure of the adsorbent, and a specific surface area of the sample was determined from the adsorption amount.

[Thicknesses of Porous Substrate and Separator]

Each of the thicknesses (μm) of the porous substrate and the separator was measured using a contact type thickness meter (LITEMATIC VL-50, manufactured by Mitutoyo Corporation). As a measuring terminal, a cylindrical measurement terminal having a diameter of 5 mm was used, and adjustment was performed during the measurement such that a load of 7 g is applied, any 20 points within a size of 10 cm×10 cm are measured, and an average value thereof is calculated.

[Thickness of Porous Layer]

The thickness (μm) of the porous layer was obtained by subtracting the thickness (μm) of the porous substrate from the thickness (μm) of the separator.

[Basis Weight of Porous Substrate]

A basis weight ($g/m^2$) was obtained by cutting the porous substrate used for producing the separator into 10 cm×10 cm, measuring the mass, and dividing the mass by the area.

<Porosity of Porous Substrate>

The porosity c (%) of the porous substrate was determined by the following formula.

$$\varepsilon=\{1-Ws/(ds \cdot t)\}\times100$$

In formula, ε, Ws, ds and t represent as follows.

ε: porosity of the porous substrate (%)

Ws: basis weight of porous substrate ($g/m^2$)

ds: true density of porous substrate ($g/cm^3$)

t: thickness of porous substrate (cm)

<Porosity of Separator>

The porosity ε (%) of the separator was determined by the following formula.

$$\varepsilon=\{1-(Wa/da+Wb/db+Wc/dc+\ldots+Wn/dn)/t\}\times100$$

Here, the constituent materials of the separator are represented by a, b, c, . . . , n, the mass per unit area of each constituent material is Wa, Wb, Wc, . . . , or Wn ($g/cm^2$), the true density of each constituent material is represented by da, db, dc, . . . , or dn ($g/cm^3$), and the thickness of the separator is represented by t (cm).

<Gurley Value of Porous Layer and Separator>

The Gurley value (sec/100 mL) of each of the porous substrate and the separator was measured in accordance with JIS P8117 (2009). The Gurley type densometer (G-B2C manufactured by Toyo Seiki Seisaku-sho, Ltd.) was used as a measurement apparatus.

<Content Ratio (Volume Ratio) of Filler>

A content ratio (volume ratio Va (%)) of the filler to the total solid content of the filler and other components including the resin in the heat-resistant porous layer was determined by the following formula.

$$Va=\{(Xa/Da)/(Xa/Da+Xb/db+Xc/Dc+\ldots+Xn/Dn)\}\times100$$

Here, among the constituent materials of the heat-resistant porous layer, the filler is represented by a, and other constituent materials containing the resin are represented by b, c, . . . , and n, respectively, the masses of the constituent materials are represented by Xa, Xb, Xc, . . . , and Xn (g), respectively, and the true densities of the constituent materials are represented by Da, db, Dc, . . . , and Dn ($g/cm^3$), respectively.

<Shrinkage Ratio in MD Direction:Heat Treatment at 100° C. for 30 Minutes>

A separator as a sample was cut out into a size of 33 cm (MD direction)×6 cm (TD direction) to obtain a test body X. Next, marks were placed at positions of 2 cm and 32 cm (points a and b) from the top on a line that divides the TD direction of the test body X into two equal parts. Next, a clip was attached to the test body X. The clip was attached to a position within 2 cm from the top of the test body X in the MD direction. Next, the test body X with the clip was suspended in an oven adjusted to 100° C. and heat-treated for 30 minutes under no tension. A length between a and b was measured before and after the heat treatment, and a shrinkage ratio (%) in the MD direction was determined according to the following Formula X1.

$$\text{Shrinkage ratio in MD direction} = \{(\text{length between a and b before heat treatment} - \text{length between a and b after heat treatment})/\text{length between a and b before heat treatment}\} \times 100 \quad \text{(Formula X1)}$$

<Thermal Shrinkage Ratio: Heat Treatment at 150° C. for 30 Minutes>

A separator as a sample was cut out into a size of 18 cm (MD direction)×6 cm (TD direction) to obtain a test body Y. Next, marks were placed at positions of 2 cm and 17 cm (points A and B) from the top on a line that divides the TD direction of the test body Y into two equal parts. In addition, marks were placed at positions of 1 cm and 5 cm (points C and D) from the left on a line that divides the MD direction of the test body Y into two equal parts. Next, a clip was attached to the test body Y. The clip was attached to a position within 2 cm from the top of the test body Yin the MD direction. Next, the test body Y with the clip was suspended in an oven adjusted to 150° C. and heat-treated for 30 minutes under no tension. Note that, considering that the test body Y might adhere in a surface of the porous substrate due to intense movement of the test body Y due to hot air, release paper was suspended in the oven in a form of sandwiching the test body Y so as not to come into contact with the test body Y to perform heat treatment. A length between A and B and a length between C and D were measured before and after the heat treatment, and thermal shrinkage ratios (%) were determined according to the following Formulas Y1 and Y2. This thermal shrinkage ratio was used as an index for evaluating heat resistance.

$$\text{Thermal shrinkage ratio in MD direction} = \{(\text{length between A and B before heat treatment} - \text{length between A and B after heat treatment})/\text{length between A and B before heat treatment}\} \times 100 \quad \text{(Formula Y1)}$$

$$\text{Thermal shrinkage ratio in TD direction} = \{(\text{length between C and D before heat treatment} - \text{length between C and D after heat treatment})/\text{length between C and D before heat treatment}\} \times 100 \quad \text{(Formula Y2)}$$

In a case in which the thermal shrinkage ratio in the MD direction was 15% or less and the shrinkage ratio in the TD direction was 15% or less, the separator was evaluated to be excellent in heat resistance.

<Core Releasing Property>

Ends of two separators (long belt shape) were inserted into a shaft core. A positive electrode, a negative electrode, and the two separators were spirally wound while the separators were pulled with a load of 500 gf (4.903 N), one of the separators was set to an innermost position, the other separator was sandwiched between the positive electrode and the negative electrode, and the positive electrode and negative electrode faced each other. The positive electrode, the negative electrode, and the two separators were wound by a predetermined length to form an electrode wound body. Thereafter, the shaft core was removed, and it was observed whether smooth removal was performed, and an appearance test of the prepared electrode wound body was performed. The observation and the appearance test were both performed visually. 30 electrode wound bodies were prepared and evaluated. Evaluation criteria are described below. A separator having an evaluation result of "A" was evaluated to have a favorable core releasing property.

—Evaluation Criteria—

A: In all the 30 electrode wound bodies, smooth removal of the shaft core and a favorable appearance could be confirmed.

B: In one to ten out of the 30 electrode wound bodies, smooth removal of the shaft core or a favorable appearance could not be confirmed.

C: In 11 to 30 out of the 30 electrode wound bodies, smooth removal of the shaft core or a favorable appearance could not be confirmed.

<Piercing Strength of Separator and Porous Substrate>

Using a KES-G5 handy compression tester (manufactured by KATO TECH CO., LTD.), a piercing strength was measured under conditions of a needle tip radius of curvature of 0.5 mm and a piercing speed of 2 mm/sec, and the measured maximum piercing load (g) was used as an index indicating the piercing strength.

<Cycle Characteristics (Capacity Retention Ratio)>

(1) Preparation of Positive Electrode 89.5 g of a lithium cobalt oxide powder as a positive electrode active material, 4.5 g of acetylene black as a conductive auxiliary agent, and 6 g of polyvinylidene fluoride as a binder were dissolved in N-methylpyrrolidone such that the concentration of polyvinylidene fluoride was 6% by mass, and the resulting solution was stirred with a double arm mixer to prepare a positive electrode slurry. This positive electrode slurry was applied to one side of an aluminum foil having a thickness of 20 dried, and then pressed to obtain a positive electrode having a positive electrode active material layer.

(2) Preparation of Negative Electrode 300 g of artificial graphite as a negative electrode active material, 7.5 g of a water-soluble dispersion containing 40% by mass of a modified styrene-butadiene copolymer as a binder, 3 g of carboxymethylcellulose as a thickener, and an appropriate amount of water were stirred with a double-armed mixer to prepare a negative electrode slurry. This negative electrode slurry was applied to one side of a copper foil having a thickness of 10 dried, and then pressed to obtain a negative electrode having a negative electrode active material layer.

(3) Manufacture of Non-Aqueous Secondary Battery

A lead tab was welded to the positive electrode and the negative electrode obtained above, and the positive electrode, the separator, and the negative electrode were layered in this order. Note that the porous layer of the separator was disposed so as to come into contact with the positive electrode to prepare a laminated body. This laminated body was inserted into a pack made of an aluminum laminate film, the inside of the pack was brought into a vacuum state using a vacuum sealer, the pack was temporarily sealed, and hot pressing was performed on the laminated body with the pack in a lamination direction of the laminated body using a hot press machine. Conditions for the hot pressing were a temperature of 90° C., a load of 20 kg per $cm^2$ of the electrode, and a pressing time of two minutes. Next, an electrolytic solution (1 mol/L $LiPF_6$-ethylene carbonate: ethyl methyl carbonate [mass ratio 3:7]) was injected into the pack, and the laminated body was impregnated with the electrolytic solution, and then the inside of the pack was sealed in a vacuum state using a vacuum sealer to obtain a non-aqueous secondary battery.

(4) Measurement of Capacity Retention Ratio

The battery obtained above was charged and discharged for 500 cycles in an environment at a temperature of 40° C. Charging was performed at a constant current and a constant voltage of 1 C and 4.2 V, and discharging was performed at a constant current of 1 C and a cutoff of 2.75 V. A discharge capacity at the 500 th cycle was divided by an initial capacity, an average of the values for ten batteries was calculated, and the obtained value (%) was taken as a capacity retention ratio.

<Load Characteristic>

A similar operation to the method in the above [Cycle Characteristics (Capacity Retention Ratio)] was performed to obtain a non-aqueous secondary battery. The battery was charged and discharged in an environment at a temperature of 15° C. A discharge capacity at the time of discharge at 0.2 C and a discharge capacity at the time of discharge at 2 C were measured, the latter was divided by the former, an average of the values for ten batteries was calculated, and the obtained value (%) was taken as a load characteristic. Charging was performed at a constant current and a constant voltage of 0.2 C and 4.2 V for eight hours, and discharging was performed at a constant current of a cutoff of 2.75 V.

Example 1

Polymetaphenylene isophthalamide (meta-type wholly aromatic polyamide; resin) was dissolved in dimethylacetamide (DMAc) such that the concentration was 4.5% by mass. Furthermore, barium sulfate particles (average primary particle size 0.05 μm; filler) were stirred and mixed therewith to obtain a coating liquid. The content mass ratio between polymetaphenylene isophthalamide and barium sulfate particles (polymetaphenylene isophthalamide: barium sulfate particles) in the coating liquid was 20:80. Next, the coating liquid was applied to one side of a polyethylene microporous film (thickness 12 μm, piercing strength 560 g, porosity 39%, Gurley value 190 sec/100 cc; porous substrate) by gravure coating to form a coating film. Next, the coating film was immersed in a coagulation liquid (water:DMAc=50:50 [mass ratio], liquid temperature: 25° C.) to solidify the coating film. The solidified coating film was washed with water, and then dried and wound up while being stretched by 2% in the MD direction at 110° C. Next, slit processing was performed under conditions of an unwinding tension of 33 N/m and a winding tension of 0.02 N/mm. In this way, a separator having a width of 65 mm and including a porous layer (thickness 4 μm) containing a resin and a filler at a ratio of 45:55 (resin:filler, volume ratio) on one side of the porous substrate was prepared.

Example 2

A separator having a width of 65 mm was prepared in a similar manner to Example 1 except that slit processing was performed under conditions of an unwinding tension of 134 N/m and a winding tension of 0.2 N/mm in Example 1.

Example 3

A separator having a width of 65 mm was prepared in a similar manner to Example 1 except that the solidified coating film was washed with water, then dried at 80° C. without being stretched, and wound up, and then slit processing was performed under conditions of an unwinding tension of 200 N/m and a winding tension of 0.3 N/mm in Example 1.

Comparative Example 1

A separator having a width of 65 mm was prepared in a similar manner to Example 1 except that the solidified coating film was washed with water, then dried at 80° C. without being stretched, and wound up, and then slit processing was performed under conditions of an unwinding tension of 33 N/m and a winding tension of 0.02 N/mm in Example 1.

Comparative Example 2

A separator having a width of 65 mm was prepared in a similar manner to Example 1 except that the solidified coating film was washed with water, then dried at 80° C. without being stretched, and wound up, and then slit processing was performed under conditions of an unwinding tension of 33 N/m and a winding tension of 0.1 N/mm in Example 1.

Comparative Example 3

A separator having a width of 65 mm was prepared in a similar manner to Example 1 except that the solidified coating film was washed with water, then dried and wound up while being stretched by 0.2% in the MD direction at 110° C. in Example 1.

TABLE 1

| | Separator manufacturing conditions | | | | Measurement and evaluation Separator | | |
| | Stretch of coating film | | Slit processing | | Shrinkage ratio in MD | Thermal shrinkage ratio [150° C. × 30 min] | |
| | Stretch temperature (° C.) | Stretch ratio (%) | Unwinding tension (N/m) | Winding tension (N/mm) | direction [100° C. × 30 min] (%) | MD direction (%) | TD direction (%) |
| Example 1 | 110 | 2 | 33 | 0.02 | 1.8 | 7 | 5 |
| Example 2 | 110 | 2 | 134 | 0.2 | 2.3 | 8 | 5 |
| Example 3 | Unstretched | | 200 | 0.3 | 1.3 | 5 | 6 |
| Comparative Example 1 | Unstretched | | 33 | 0.02 | 1.1 | 4 | 5 |
| Comparative Example 2 | Unstretched | | 33 | 0.1 | 1.2 | 4 | 4 |
| Comparative Example 3 | 110 | 0.2 | 33 | 0.02 | 1.2 | 4 | 4 |

TABLE 1-continued

| | Measurement and evaluation | | | | | | |
| | Separator | | | | | Battery | |
| | Core releasing property | Thick-ness (μm) | Piercing strength (g) | Porosity (%) | Gurley value (sec/100 cc) | Cycle characteristics (%) | Load characteristics (%) |
|---|---|---|---|---|---|---|---|
| Example 1 | A | 16 | 620 | 56 | 240 | 92 | 92 |
| Example 2 | A | 16 | 615 | 58 | 230 | 93 | 93 |
| Example 3 | A | 16 | 630 | 53 | 250 | 92 | 91 |
| Comparative Example 1 | C | 16 | 635 | 52 | 265 | 92 | 91 |
| Comparative Example 2 | B | 16 | 630 | 52 | 260 | 92 | 91 |
| Comparative Example 3 | B | 16 | 630 | 52 | 260 | 92 | 91 |

As presented in Table 1, each of the separators of Examples, which includes a porous substrate and a porous layer provided on one side of the porous substrate and containing a resin and a filler, and in which the shrinkage ratio in the MD direction when each of the separators is heat-treated under specific conditions satisfies a specific range, had a favorable core releasing property.

In the separators of Comparative Examples, a separator in which the shaft core could not be smoothly removed, and the appearance of the electrode wound body after the shaft core was removed had a bamboo shoot shape was confirmed.

Each of the separators of Examples had a low thermal shrinkage ratio and excellent heat resistance. The battery to which any one of the separators of Examples was applied was excellent in cycle characteristics and load characteristics.

The disclosure of Japanese Patent Application No. 2020-09485 filed on May 25, 2020 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A separator for a non-aqueous secondary battery, the separator comprising:
a porous substrate; and
a porous layer that is provided only on one side of the porous substrate and that contains a resin and a filler,
wherein a shrinkage ratio in a MD direction of the separator for a non-aqueous secondary battery, when heat-treated at 100° C. for 30 minutes under no tension, is more than 1.2% and less than or equal to 3.5%,
wherein a shrinkage ratio in a MD direction of the separator for a non-aqueous secondary battery, when heat-treated at 150° C. for 30 minutes under no tension, is 5% or more, and
wherein a shrinkage ratio in a TD direction of the separator for a non-aqueous secondary battery, when heat-treated at 150° C. for 30 minutes under no tension, is 5% or more.

2. The separator for a non-aqueous secondary battery according to claim 1,
wherein a shrinkage ratio in a MD direction of the separator for a non-aqueous secondary battery, when heat-treated at 150° C. for 30 minutes under no tension, is 15% or less, and wherein a shrinkage ratio in a TD direction of the separator for a non-aqueous secondary battery, when heat-treated at 150° C. for 30 minutes under no tension, is 15% or less.

3. The separator for a non-aqueous secondary battery according to claim 1, wherein the resin is a meta-type wholly aromatic polyamide.

4. The separator for a non-aqueous secondary battery according to claim 1, wherein the filler contains at least one selected from the group consisting of a metal oxide, a metal hydroxide, a metal nitrate and a metal salt.

5. The separator for a non-aqueous secondary battery according to claim 1, wherein an average primary particle size of the filler is from 0.01 μm to 0.30 μm.

6. The separator for a non-aqueous secondary battery according to claim 1, wherein a piercing strength of the separator for a non-aqueous secondary battery is higher than a piercing strength of the porous substrate.

7. A non-aqueous secondary battery that obtains electromotive force by lithium doping and dedoping, the non-aqueous secondary battery comprising:
a positive electrode;
a negative electrode; and
the separator for a non-aqueous secondary battery according to claim 1, the separator being disposed between the positive electrode and the negative electrode.

8. The separator for a non-aqueous secondary battery according to claim 2, wherein the resin is a meta-type wholly aromatic polyamide.

9. The separator for a non-aqueous secondary battery according to claim 2, wherein the filler contains at least one selected from the group consisting of a metal oxide, a metal hydroxide, a metal nitrate and a metal salt.

10. The separator for a non-aqueous secondary battery according to claim 2, wherein an average primary particle size of the filler is from 0.01 μm to 0.30 μm.

11. The separator for a non-aqueous secondary battery according to claim 2, wherein a piercing strength of the separator for a non-aqueous secondary battery is higher than a piercing strength of the porous substrate.

12. A non-aqueous secondary battery that obtains electromotive force by lithium doping and dedoping, the non-aqueous secondary battery comprising:
a positive electrode;
a negative electrode; and
the separator for a non-aqueous secondary battery according to claim 2, the separator being disposed between the positive electrode and the negative electrode.

* * * * *